W. H. ANDERSON.
Apparatus for Destroying Insects.
No. 229,230.  Patented June 29, 1880.
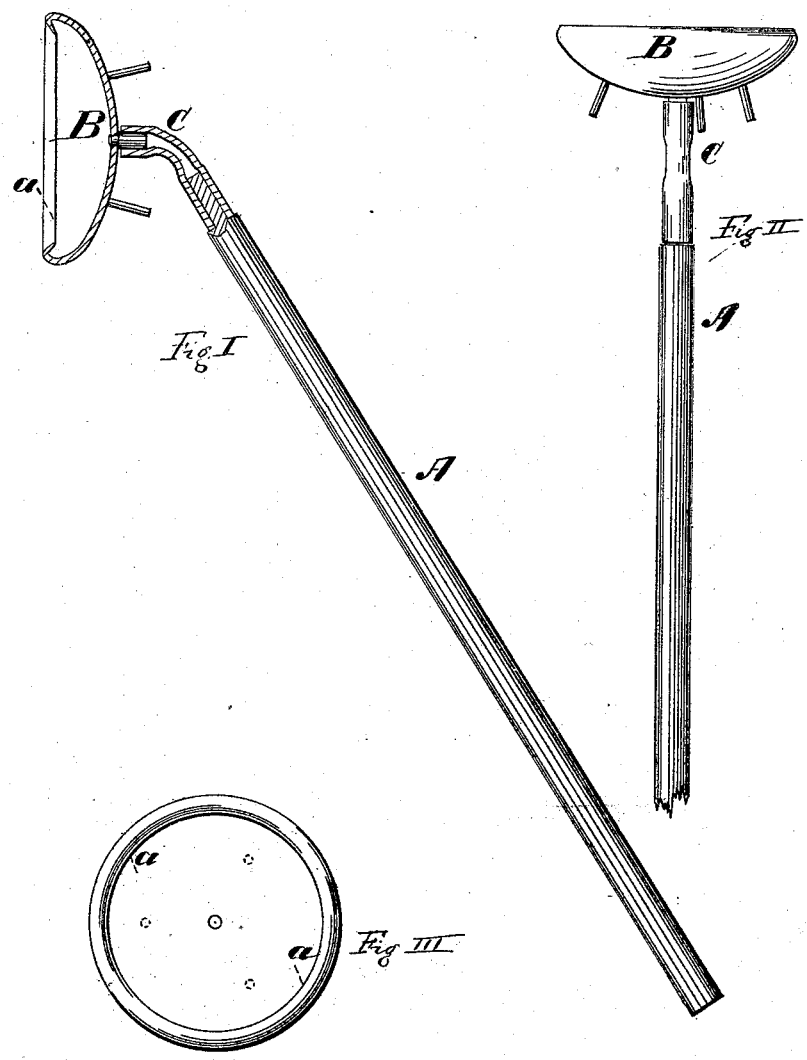

UNITED STATES PATENT OFFICE.

WILLIAM H. ANDERSON, OF BROOKLYN, E. D., NEW YORK.

APPARATUS FOR DESTROYING INSECTS.

SPECIFICATION forming part of Letters Patent No. 229,230, dated June 29, 1880.

Application filed December 2, 1879.

*To all whom it may concern:*

Be it known that I, WILLIAM H. ANDERSON, of Brooklyn, E. D., in the county of Kings and State of New York, have invented certain Improvements in Devices for Killing Mosquitoes, &c., of which the following is a specification.

This invention is designed to afford a simple, convenient, and efficient implement for destroying mosquitoes in rooms or apartments. Said implement is to be used for capturing and destroying the insects when alighted or settled upon the walls, as is commonly observed with the pests during the summer months.

The invention comprises a novel combination of a concavo-convex disk or cup adapted to receive an internal coating of molasses or other adhesive substance, a staff whereby the said cup is wielded, and a universal elastic joint or connection, formed, preferably, of india-rubber, by which the disk or cup is attached to the staff in such a manner that the cup itself may turn readily to any angle with the staff, as required in the operation, hereinafter explained, of the device.

The invention further comprises a novel combination of parts whereby convenience and cleanliness in the use of said implement is materially promoted.

Figure I is a side view and section of an implement embracing my said invention. Fig. II is a side view, and Fig. III an end view, thereof.

A is the staff, of wood or other suitable material, and B is the concavo-convex disk or cup, of metal or other appropriate material. The periphery of said cup should be turned inward, as represented more fully in Fig. I, to provide a flange, *a*, the purpose of which will hereinafter appear.

The disk or cup B is attached to the staff A by a flexible joint or connecting-piece, C, which preferably is formed of a piece of india-rubber tubing, one end of which is made fast upon a stud, *b*, projecting centrally from the bottom or outer surface of the disk or cup, while the other end of said piece of tubing is in a similar manner attached to one extremity of the staff.

In the use and operation of the implement a small portion of molasses is placed in the disk or cup B. The implement is then wielded to bring the cup over the insect as the latter is settled or alighted upon the wall, the flexible connection between the cup and the staff permitting the cup to adjust itself flatly and snugly against the wall, whereupon the insect, startled from its perch, flies or springs in contact with the inner surface of the cup, and is caused to adhere thereto by the adhesive material.

Inasmuch as when used to destroy the insects upon vertical walls the disk or cup will be frequently brought into the position represented in Fig. I, the office of the flange *a* is to collect viscous or semi-fluid material in said disk or cup, and prevent it from flowing out therefrom during the manipulation or use of the implement.

I have fully tested my said invention, and on actual trial have found that out of forty mosquitoes counted upon the walls of a room thirty-nine were captured and destroyed in less than two minutes.

When desired, three or more pins may be provided on the bottom or external surface of the cup to serve as legs for the latter, so that when it is detached from the flexible connection it might be used, if desired, as a fly-trap, the said pins serving as legs to support the cup.

I do not claim an insect-killing device composed substantially of a striking-flap and nothing more, as represented in the patent of N. D. Forbes, dated June 16, 1868, No. 78,950; neither do I claim an insect-killing device dependent for its operation upon the expression of noxious vapors, as shown and described in the patent of E. B. Johnston, dated February 6, 1877, No. 187,016; neither do I claim an insect-killing apparatus composed of a trough having an opening in one side and suspended upon the bail of an operating-staff, as shown and described in the patent of B. Atwater, dated October 5, 1858, No. 21,646; but

What I claim as my invention is—

1. The within-described device for catching insects, composed of a staff, a cup to be coated internally with a sticky substance for covering and catching the insect, and a universal joint uniting the cup with the staff, all substantially as set forth.

2. In combination with a staff and universal joint, the cup B, provided with the flange *a*, for retaining a sticky substance applied to the inner surface of the cup, substantially as described.

WM. H. ANDERSON.

Witnesses:
CHAS. H. DOXAT,
H. WELLS, Jr.